US006625732B1

(12) United States Patent
Weirauch et al.

(10) Patent No.: US 6,625,732 B1
(45) Date of Patent: Sep. 23, 2003

(54) METHOD FOR TRACKING THE DEVICES USED TO LOAD, READ, AND WRITE REMOVABLE STORAGE MEDIA

(76) Inventors: Charles R Weirauch, 3962 Foothills Dr., Loveland, CO (US) 80537; C Shane Reid, 1000 Kalen Way, Mountain View, CA (US) 94040

( * ) Notice: Subject to any disclaimer, the term of this patent is extended or adjusted under 35 U.S.C. 154(b) by 0 days.

(21) Appl. No.: 09/302,702

(22) Filed: Apr. 29, 1999

(51) Int. Cl.[7] ................... G06F 11/60; G06F 13/10; G06F 12/08
(52) U.S. Cl. ................... 713/200; 713/201; 714/4; 714/202; 714/112; 714/113; 360/48
(58) Field of Search ................... 713/200–201; 714/4, 202, 112, 113; 360/48

(56) References Cited

U.S. PATENT DOCUMENTS

| | | | |
|---|---|---|---|
| 4,688,169 A | | 8/1987 | Joshi ................... 364/200 |
| 5,805,800 A | * | 9/1998 | Kotani et al. |
| 5,909,692 A | * | 6/1999 | Yanai et al. ................... 711/4 |
| 5,940,854 A | * | 8/1999 | Green, Jr. et al. ............ 360/48 |
| 6,070,177 A | * | 5/2000 | Kao et al. ................... 707/901 |
| 6,154,790 A | * | 11/2000 | Pruett et al. ................... 710/5 |

FOREIGN PATENT DOCUMENTS

| | | | | |
|---|---|---|---|---|
| EP | 0464320 A | 1/1992 | ............ | G06F/1/00 |
| EP | 0593305 A | 4/1994 | ........... | G11B/23/28 |
| EP | 0640924 A | 3/1995 | ........... | G06F/12/14 |
| EP | 0853315 A | 7/1998 | ........... | G11B/20/00 |
| WO | WO9010292 A | 9/1990 | ........... | G11B/20/00 |

OTHER PUBLICATIONS

Yamaha CRW–4260t vs CRW–4261t, Hradware one review, 1998, taken from Jtech communications, pp. 1–14.*
IBM Technical Disclosure Bulletin, Method for tracking programs and data storage media, vol. 37, No. 8, Aug. 1994, p. 257.*

* cited by examiner

Primary Examiner—Gail Hayes
Assistant Examiner—Taghi T. Arani

(57) ABSTRACT

A method of identifying previous drives that have accessed a data storage medium. Preferably, compatible drives have an electronically readable identifier, that includes, for example, a unique manufacturer code, drive model number, and drive serial number. Alternatively, a drive identification may be generated by a host computer software device driver. A portion of the medium is dedicated to an Access Audit Table that lists the drive identifiers for the drives that have recently accessed the medium. In addition, a portion of the medium may be dedicated to a Unique Drive Table, which stores the drive identifiers of the most recent distinct drives that have accessed the medium. Any time a writable medium is accessed, the drive must automatically write the drive identifier to the Access Audit Table and, if appropriate, to the Unique Drive Table. Compatible drives must also reject any external commands to write to the Access Audit Table or to the Unique Drive Table. The method enables a possessor of a medium, or a computer operator, to determine for a particular medium, a list of the different drives that have accessed the medium, and the sequential order of drives that have accessed the medium.

3 Claims, 2 Drawing Sheets

METHOD FOR TRACKING THE DEVICES USED TO LOAD, READ, AND WRITE REMOVABLE STORAGE MEDIA

FIELD OF INVENTION

This invention relates generally to data storage drives having a removable storage medium and more specifically relates to security of data on the removable medium such as confirmation of data integrity and determination of whether data has been read or written by unauthorized persons.

BACKGROUND OF THE INVENTION

For computer readable data, there is a general need for confirmation of data integrity. That is, there is a need to be able to determine whether data has been modified. In addition, sometimes there is a need to see whether data has been read, particularly by someone not authorized to read the data. Data security is a particular concern for removable storage media such as flexible disks, removable hard disk cartridges, tape cartridges, and writeable optical disks. For removable rewritable media that can be easily mailed or otherwise transferred from one system to another, there is a particular need for aids to help detect tampering or unauthorized reading.

SUMMARY OF THE INVENTION

A secure media access audit trail is provided by requiring drives to record a drive identification on a writeable medium each time the medium is accessed by the drive. As a result, a possessor of a writable medium can identify the last N distinct drives that have accessed the medium, and the drives that accessed the medium the last M times, where N and M are maximum numbers that are medium dependent. Depending on the need of the possessor of a medium, it may be sufficient to track loading of a medium into a drive. As an alternative, or as an addition, it may be preferable to track reading, if unauthorized reading is the primary concern, or writing, if data integrity is the primary concern. In the present patent document, the word "access" is intended to include loading, reading, writing, or any other trackable drive/medium events of interest. All compatible storage drives that are capable of writing to a particular medium are required to participate in the access audit process. Preferably, compatible drives have an electronically readable identifier, that includes, for example, a unique manufacturer code, drive model number, and drive serial number. Alternatively, a drive identification may be generated by a host computer software device driver in combination with a drive. A portion of the medium is dedicated to a Unique Drive Table, which, for example, may be a circular buffer, that stores the drive identifiers of the last N distinct drives to access the medium. In addition, a portion of the medium is dedicated to a Access Audit Table, that can store a fixed number (M) of drive identifiers. Any time a writable medium is accessed, the drive must automatically write the drive identifier to the Access Audit Table. Compatible systems must reject any external commands to write to the Unique Drive Table or to the Access Audit Table.

The method of the invention is useful, for example, to enable a computer operator to determine for a particular medium, a list of the different drives in which the medium has been accessed, and the sequential order of drives into which the medium has been accessed. This information in turn may be useful to determine whether the data on the medium may have been modified or read by unauthorized persons.

DETAILED DESCRIPTION OF THE PREFERRED EMBODIMENT OF THE INVENTION

Figure 1:
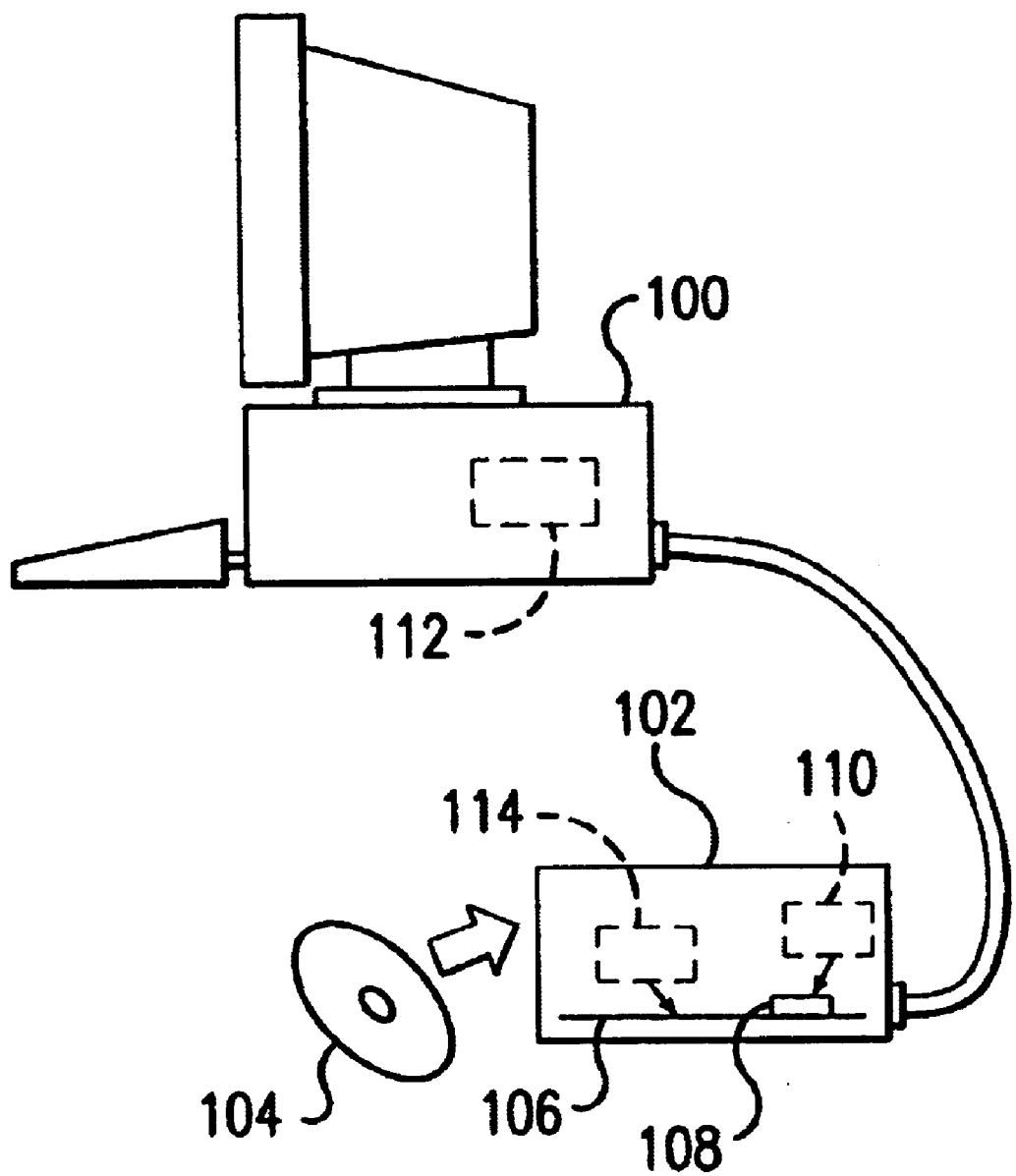
FIG. 1 is a block diagram of a computer system including a data storage drive and a data storage medium in accordance with the invention.

FIG. 1 illustrates a computer system 100 including a data storage drive 102 in accordance with the invention. Note that data storage drives are not restricted to "computer" systems, but also may be employed in data communications equipment, electronic test equipment, automatic transaction machines for banking, and other electronic systems that may require recorded data. Drive 102 is depicted as an external peripheral device but the drive may be installed in the cabinet containing the computer processor. Also illustrated in FIG. 1 is an optical disk 104. The disk may, for example, be a recordable (write-once) compact disk (CD-R), a rewritable compact disk (CD-RW), or a recordable (write-once) or rewritable DVD disk. Disk 104 is just an example of a removable writeable medium, and the invention is equally applicable to flexible disks, removable hard disk cartridges, tape cartridges, non-volatile RAM cards, and any other removable data storage media. Drive 102 may include a controller 106 having a processor 108. Processor 108 uses software 110 (called firmware) for controlling the drive. Computer 100 may also include software 112 (called a device driver) for interchange of control messages and data with the drive.

In compatible systems, a drive must record a drive identification on the medium each time the medium is accessed by the drive. Preferably, the drive identification is included in the drive 102 as illustrated by reference number 114 in FIG. 1 and preferably, drive identification 114 is non-volatile and electronically readable by the drive firmware 110. For example, reference number 114 may be stored in non-volatile random access memory that is part of processor 108 or separately on controller 106. Alternatively, reference number 114 may be encoded in patterns of printed circuit board traces with portions that are selectively removed during manufacturing, or may be generated by any other method from which a permanent unique drive identifier may be read by the drive. The drive identification may alternatively be generated by device driver code 112 in the computer, as discussed in more detail below. The drive identification 114 is a number, where the number may include codes for alpha characters and symbols. The drive identification 114 is preferably permanent and non-alterable. However, for purposes of the invention, it may be suitable for the drive identification to merely be difficult to alter without specialized equipment. The drive identification 114 is preferably determined at the time the drive 102 is manufactured. However, for purposes of the invention, it may be suitable for the drive identification 114 to be determined before a medium is first accessed by an end customer or, if repeatable, redetermined every time the drive is initialized. The drive identification is preferably unique for each individual drive. However, for purposes of the invention, it may be suitable if there is merely a low probability that a medium such as disk 104 is ever accessed into two drives having the same drive identification.

Permanent unique drive identification numbers that are readable by drive controller electronics have been previously proposed as a part of various auto-configuration standards. The following example is suitable for drive identification 114 and is also consistent with prior drive identification proposals for auto-configuration. Each drive manufacturer is assigned a unique manufacturer code. A 16-bit unsigned integer is suitable to uniquely identify 65,536 manufacturers. An additional 16-bit unsigned integer is used to define a model code. Model codes may include, for example, firmware revisions. Finally, the drive identification preferably includes a serial number that is preferably unique to each drive (of the particular model) made by the manufacturer. A 32-bit unsigned integer is suitable to encode about 4.3 billion unique serial numbers.

As one alternative, every drive of a particular model may have the drive identification in firmware, so that every drive of the particular model has the same 32-bit serial number. This is less desirable, but may be commercially necessary. Preferably, if the firmware is upgraded, the drive serial number is not changed or is still available. Another alternative is for the drive identification to be generated by the host computer device driver. When the drive is installed, the driver could prompt the operator for a number, which might, for example, be a human readable serial number printed on the drive but not readable by the drive controller electronics. Alternatively, just the manufacturer number and model number could be entered manually and the device driver could generate a random 32-bit serial number. Alternatively, the device driver could generate a serial number from a unique number associated with the host computer, such as a serial number of the firmware (BIOS) for the computer. If the device driver provides the serial number, either the device driver should save the number in non-volatile memory, or the device driver should employ a deterministic algorithm to always recreate the same number every time the driver is loaded. If the device driver provides the serial number, the drive may obtain the drive identification from the device driver at initialization time.

In general, recorded data is formatted into addressable units called sectors, blocks, tracks, or other unit terminology. The term "sector" is commonly used for the smallest addressable unit and "block" is commonly used for the smallest unit that be read or written (typically multiple sectors). In the following discussion, the term "sector" will be used, but it should be understood that any addressable unit other than a sector is also suitable. It should be understood that a drive may have to read an entire block, modify one sector, and rewrite an entire block. Drive firmware for compatible drives must reserve at least one sector on the medium for storing an Access Audit Table. A commonly used sector size is 1,024 bytes (or 2,048 bytes), which can hold 128 64-bit drive identifications (or 256 identifications if sectors are 2,048 bytes) as defined above.

Each time a medium is accessed by the drive, the drive must write its drive identification into the Access Audit Table (however, as discussed below, it may be preferable to suppress repetitive entries). Preferably, the Access Audit Table is a circular buffer, so that once it is filled, a new entry erases the oldest entry in the buffer. Of course, this assumes that the medium is rewritable. Regardless of the form of the Access Audit Table, a pointer is needed for the next available location for a new entry. For example, assuming 64-bit drive identifications as discussed above, a reserved value may be placed in the manufacturer code part of the drive identification in the next available table entry. When a new drive identification needs to be added, the reserved value is located, the new drive identification is recorded at that position in the table, and the reserved value is written into the manufacturer code area of the next available location in the table.

In addition to the Access Audit Table, compatible drives may also reserve at least one sector on the medium for a Unique Drive Table. The Unique Drive Table is used to store each unique drive identifier. For example, assume that loads are tracked, and consider the following sequence of loads. For simplicity of illustration, assume that drive identifications are single letters. Assume that a medium is loaded into the following drives in the following order: (1) A; (2) A; (3) A; (4) C; (5) A; (6) C; (7) B; (8) A. The Access Audit Table may contain the sequence A, A, A, C, A, C, B, A. Alternatively, a single entry may be used for repetitive loads to the same drive, in which case the Access Audit Table may contain the sequence A, C, A, C, B, A. The Unique Drive Table will contain A, C, B (if identifiers are stored in the order in which a unique identifier is added) or perhaps A, B, C (if identifiers are stored in numerical order).

Compatible systems must refuse all external commands to write into the Access Audit Table or into the Unique Drive Table. Writing into the Access Audit Table or Unique Drive Table must be restricted to writing the drive identification, by the drive, in response to accessing a medium.

Finally, compatible systems include applications software to read the Access Audit Table and the Unique Drive Table (if present) and render its contents into a human readable form. By reading the Access Audit Table and the Unique Drive Table on a medium, a possessor of the medium can discover which drives have accessed the medium. If there is any doubt about whether the data on the medium has been modified or read, the possessor can identify, for example, the drives that accessed the medium the last 127 times (preferably nonrepetitive accesses) and the last 127 distinct drives that have accessed the medium.

Figure 2:
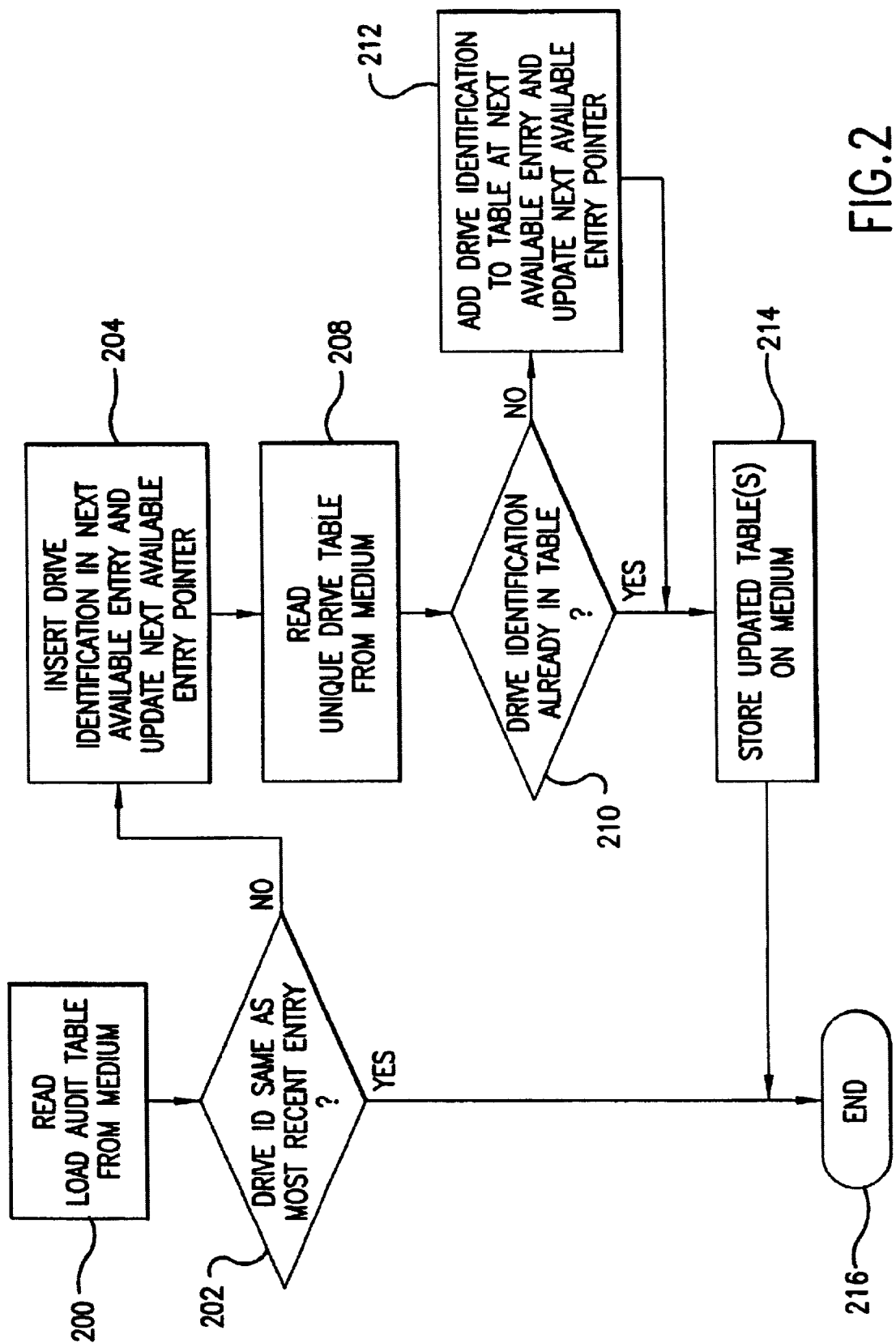
FIG. 2 is a flow chart of an example method in accordance with the invention.

FIG. 2 is a flow chart of an example method in accordance with the invention. The method of FIG. 2 assumes that only nonrepetitive accesses are entered into the Access Audit Table. In step 200, a drive reads the Access Audit Table from a newly accessed medium. In step 202, the drive determines whether the drive identification is the same as the most recent entry in the Access Audit Table. If the drive ID and the most recent entry are the same, there is no need to enter the repetitive data, and there is no need to check the Unique Drive Table. If the drive ID and the most recent entry in the Access Audit Table are different, the drive determines the next available entry pointer in the Access Audit Table, inserts the drive identification at the next available entry and updates the next available entry pointer (step 204). In step 208, the drive reads the Unique Drive Table from the medium. In step 210, the drive searches the Unique Drive Table and determines whether its drive identification is already entered into the Unique Drive Table. If the drive identification is already entered, no further action is necessary (step 216). If the drive identification is not already entered, the drive enters its drive identification at the next available entry in the table and updates the next available entry pointer (step 212). At step 214, the drive stores the updated table(s) on the medium.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of tracking drives that have accessed a data recording medium, the method comprising the following steps:

(a) receiving the medium by a drive;

(b) reading a drive identifier, by the drive; and (c) recording, by the drive, the drive identifier, on the medium, in a list reserved for a plurality of identifiers of drives that access the medium, listed sequentially in the order of access.

2. The method of claim 1 further comprising:

(d) reading, by the drive, from the medium, a list of unique drive identifiers from drives that have accessed the medium in the past; and (e) recording, by the drive, the drive identifier, on the medium in the list of step (d), when the list of step (d) indicates that the drive identifier is not already recorded.

3. The method of claim 1 further comprising:

(d) receiving, by the drive, a command to write data in an area on the medium reserved for drive identifiers; and (e) refusing, by the drive, to write into the area in response to the command.

* * * * *